US008313021B2

(12) United States Patent
Bodington et al.

(10) Patent No.: US 8,313,021 B2
(45) Date of Patent: Nov. 20, 2012

(54) SYSTEM AND METHOD FOR MANAGING ENHANCEMENT FEATURES ASSIGNED TO FINANCIAL PRESENTATION DEVICES

(75) Inventors: Shaun Bodington, San Leandro, CA (US); Barbara Elizabeth Patterson, South San Francisco, CA (US); Gregory Charles Trifiletti, San Francisco, CA (US)

(73) Assignee: Visa U.S.A., San Francisco, CA (US)

( * ) Notice: Subject to any disclaimer, the term of this patent is extended or adjusted under 35 U.S.C. 154(b) by 936 days.

(21) Appl. No.: 12/025,267

(22) Filed: Feb. 4, 2008

(65) Prior Publication Data

US 2008/0296369 A1  Dec. 4, 2008

Related U.S. Application Data (60) Provisional application No. 60/940,605, filed on May 29, 2007.

(51) Int. Cl.
*G06K 5/00* (2006.01)
(52) U.S. Cl. ........ 235/380; 235/379; 235/492; 235/490; 235/493
(58) Field of Classification Search .................. 235/379, 235/380, 490, 492, 493
See application file for complete search history.

(56) References Cited

U.S. PATENT DOCUMENTS

| 5,970,478 | A   | * | 10/1999 | Walker et al. ............... 705/35 |
| 2003/0101131 | A1 | * | 5/2003 | Warren et al. ............... 705/38 |
| 2004/0083184 | A1 |   | 4/2004 | Tsuei et al. |
| 2004/0172309 | A1 |   | 9/2004 | Selwanes et al. |
| 2005/0137949 | A1 |   | 6/2005 | Rittman et al. |
| 2005/0154664 | A1 |   | 7/2005 | Guy et al. |
| 2007/0073616 | A1 | * | 3/2007 | Silbernagel et al. ............ 705/39 |

OTHER PUBLICATIONS

International Patent Application PCT/US08/62166, International Search Report and Written Opinion, Aug. 21, 2008.

* cited by examiner

*Primary Examiner* — Kristy A Haupt
(74) *Attorney, Agent, or Firm* — Greenberg Traurig, LLP (57) ABSTRACT

A system for managing enhancement features assigned to financial presentation devices such as credit cards. The system includes an accounts database and a feature management module. The accounts database stores account holder data containing assigned enhancement features for associated credit cards. The feature management module is capable of updating and managing the assigned features of an individual credit card independently of other cards so as to provide enhancement features that can be customized for each individual cardholder.

18 Claims, 7 Drawing Sheets

ACCOUNTS DATABASE 16

| ACCOUNT NO. | CARD ISSUED | TYPE | APPEARANCE | FEATURES ASSIGNED | | |
|---|---|---|---|---|---|---|
| ACCT. 1 | Y | CLA | GOLD | EH1 | EH3 | EH4 |
| ACCT. 2 | Y | SIG | PLAT | EH2 | EH5 | GP3 |

SYSTEM AND METHOD FOR MANAGING ENHANCEMENT FEATURES ASSIGNED TO FINANCIAL PRESENTATION DEVICES

CROSS REFERENCE TO RELATED APPLICATIONS

This application claims priority under 35 U.S.C. §119(e) to U.S. Provisional application, Ser. No. 60/940,605, filed May 29, 2007, which is incorporated herein by reference.

FIELD OF THE INVENTION

The present invention relates to a data processing system, and more particularly a system for managing enhancement features assigned to financial presentation devices that are presented to providers of goods and services for payment.

BACKGROUND OF THE INVENTION

Today, most people carry portable financial presentation devices such as credit cards, debit cards, prepaid cards, stored value devices and smart tag devices to pay for goods and services without using cash. All of these financial presentation devices have an account number by which an individual device is uniquely identified. In the case of a credit card, the account number typically has a 16 digit card number embossed on the card. The 16 digit number consists of an initial 6 digit Bank Identification Number (BIN), followed by a 10 digit number. The BIN identifies the issuer bank such as Bank of America® and Chase® that issued the card. The remaining 10 digit number identifies a particular card issued by the issuer. Accordingly, the 16 digit number on the credit card uniquely identifies a card and therefore the cardholder.

Over the years, the card issuers have developed different card types to more effectively target a variety of customer segments to serve customer needs and increase card usage at the same time. For Visa® credit cards, for example, the product types include Visa® Traditional, Traditional Rewards, Signature and Signature Preferred just to name a few.

Each card type has a different set of enhancement features assigned to it. Enhancement features are services or goods that a card issuer provides in addition to processing purchase transactions of the cardholders. Examples of enhancement features include zero liability from loss of card, auto rental collision damage waiver, emergency cash disbursement and card replacement, lost/stolen card reporting, extra warranty period for products, travel accident insurance, lost luggage reimbursement, roadside dispatch, cash back and frequent flyer mileage.

At the low end, the Visa Traditional card is targeted to customers that are new to credit and sub-prime customers. The low end card may have a very limited set of basic or core enhancement features such as zero liability from loss of card. At the high end, Visa Signature Preferred card is offered to high net worth individuals with a high card usage. In addition to the set of basic enhancement features assigned to the low end card, the high end card may have an additional set of optional enhancement features such as airport lounge access, extras warranty period and companion airline ticket.

Conventionally, these card types have been managed by either the 6 digit BIN or the 9 digit BIN range of the card number. In other words, the type of a particular card is determined by the initial 6 digit or 9 digit number of that card. Accordingly, when a cardholder contacts a provider of an enhancement feature, the provider only needs to ask for the initial 9 digit number of the card to determine whether the enhancement feature is assigned to the cardholder.

However, as persons of ordinary skill in the art will appreciate, all holders of a specific type of card would have the same set of enhancement features regardless of whether certain cardholders desire all of the enhancement features or not. This leads to at least two problems. One problem is that it is difficult to determine which enhancement features are desirable by which customers. This leads to operating inefficiency which results in customer dissatisfaction and lost profit. Specifically, as certain holders of a particular card type may want features that are not associated with that card type, they will likely use the card less often. This results in customer dissatisfaction and lost revenue. On the other hand, some cardholders may not want certain features associated with that card type. In that case, the card issuer is paying for providing enhancement features that many cardholders are not using, which reduces the issuer's profitability.

The other problem of managing card types by the 6 digit BIN or 9 digit BIN range is that even if an issuer offers a new product type that contains a desired enhancement feature for certain cardholders, they may be very reluctant to switch to the new card because switching requires changing the number of the card. The reluctance to change is even greater today because the card number information is increasingly being stored in various Internet shopping vendors and the cardholder's online accounts that switching the card number may involve a lot of time and effort that the cardholder may not want to expend.

Therefore, it is desirable to provide a system and method for more efficiently managing enhancement features for financial presentation devices to deliver the desired enhancement features to the right customers. It is also desirable to provide a system and method for determining which enhancement features are desirable by which customers in order to improve customer satisfaction and increase the usage of the financial presentation devices.

SUMMARY OF THE INVENTION

According to one aspect of the present invention, a system for managing enhancement features on an individual financial presentation device basis is provided. The system includes an accounts database and a feature management module that runs in a computer. The accounts database stores account holder data containing assigned enhancement features for associated financial presentation devices. The feature management module is capable of updating and managing the assigned features of an individual financial presentation device independently of other financial presentation devices so as to provide enhancement features that can be customized for each individual presentation device holder.

According to another aspect of the present invention, a method of managing enhancement features assigned to financial presentation devices in an accounts database is provided. Each financial presentation device is presentable to providers of goods or services and is associated with a respective one of individual financial accounts. The accounts database stores account holder data for the financial accounts with each account holder data containing assigned enhancement features for an associated financial presentation device. The method involves receiving an account identifier that uniquely identifies an individual financial presentation device along with a selection of enhancement features to be assigned to the identified financial presentation device. The assigned enhancement features for the identified financial presentation device are updated independently of other financial presentation devices.

DETAILED DESCRIPTION OF THE INVENTION

For purposes of illustration and clarity, the present invention will be discussed in the context of using a credit card. However, persons of ordinary skill in the art will appreciate that the novel features disclosed herein apply to all types of portable financial presentation devices including, but not limited to, credit cards, debit cards, prepaid cards, electronic benefit cards, charge cards, smart cards, key chain devices, personal digital assistants, cell phones, stored value devices or the like so long as the device can be presented to a seller of goods or services for payment.

According to the present invention, rather than defining a product type by a BIN or a 9 digit BIN range, the present invention, in essence, does away with such defined product types. This is done by a system that manages enhancement features on an individual card basis without any rigid product type definitions. As such, the enhancement features for each card are custom tailored so that the card can be its own product type.

As can be appreciated, the present system of managing enhancement features at the account number level provides substantial benefits for all entities involved. The card issuers benefit because they can develop customized or specialized card products to meet defined customer segments (e.g., Hispanic, youth, affluent, travelers, shoppers, etc.), which can be as small as one cardholder. Also, as the issuer can control the enhancement features of individual cardholders, it can target a specific customer segment, add a particular enhancement feature and analyze the spending pattern of the targeted segment afterwards to see the effect of the added enhancement feature. For example, the issuer can target a segment of cardholders that charges an average of at least $5000 per year in a travel related category, offer an airport lounge access feature to the targeted segment, and analyze in the future the changes in spending pattern of the target segment to see how effective the airport lounge access feature was to the targeted segment.

Accordingly, controlling the enhancement features on an individual card level basis allows the issuer to better correlate the customer spending pattern to particular enhancement features to find out which features may be useful to which cardholders. With this information, the issuer can more precisely target specific customer segments with those enhancement features that are likely to be useful, which will lead to increased card usage.

Cardholders also receive many benefits. With the present invention, the issuers are more likely to offer those enhancement features that are more useful to the individual cardholders. The present invention also allows each cardholder to personalize the card by selecting his own card enhancements based on his own needs and interests. Moreover, because individual enhancement features can be assigned to each card independent of other cards, the card can be switched to a different product type without changing the card number. For example, a card with a 1% cash back enhancement feature can be switched to a card offering a 1.5% cash back enhancement feature without the card number change. As another example, a Visa Traditional card can be changed to a Visa Signature card type without the card number being changed.

The present invention also benefits card transaction processing interchange entities such as Visa. As the provider of the central enhancement feature management system, the interchange entity can gain a comprehensive view of enhancement feature assignments and changes. Consequently, the interchange entity can provide broad insights into cardholder lifetime value by correlating cardholder spending with enhancement features, which allows issuers to optimize enhancement feature offerings that drive card usage.

Figure 1:
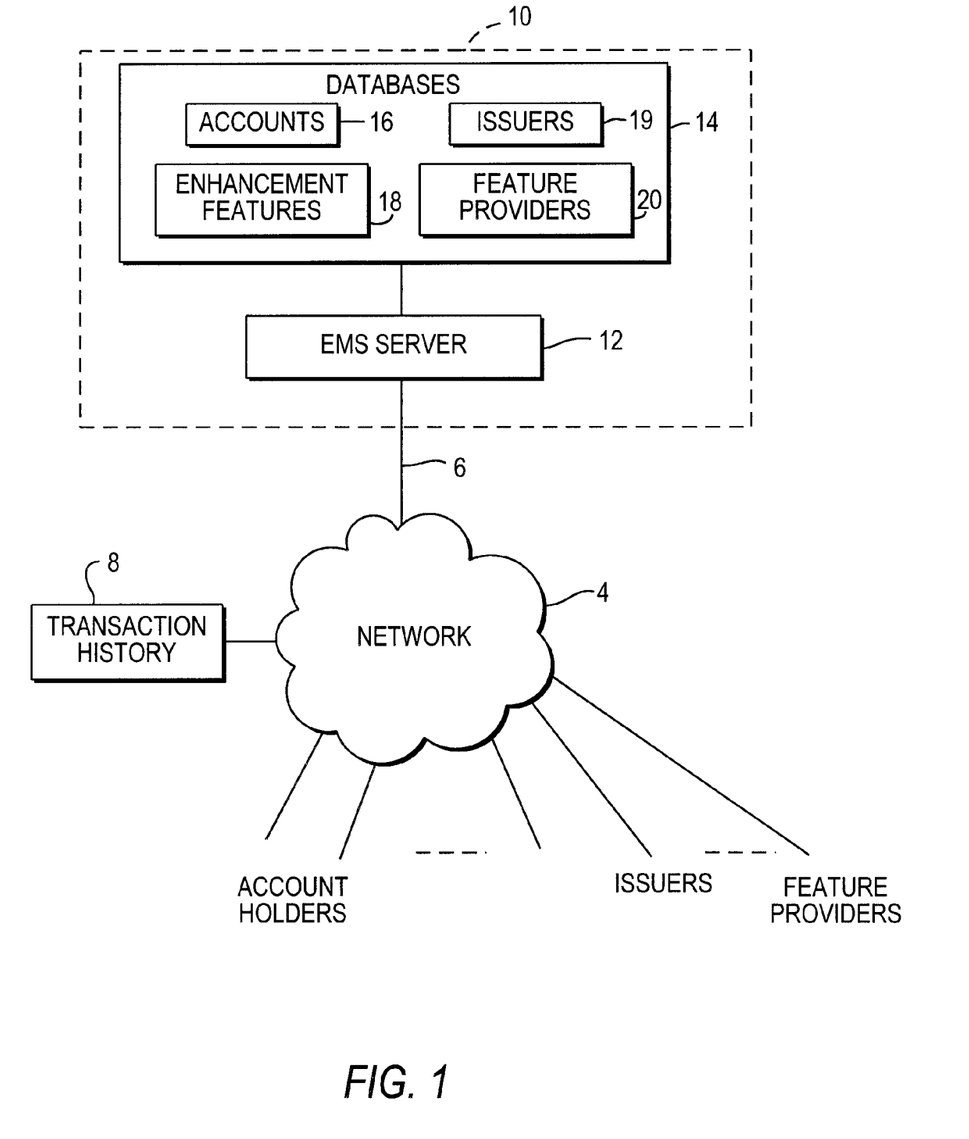
FIG. 1 is a block diagram of an exemplary enhancement features management system.

An exemplary block diagram of the above-described enhancement features management system 10 is shown in FIG. 1. The centralized enhancement features management system contains an Enhancement Management System (EMS) server 12 and a set 14 of databases that are in communication with the EMS server. The set 14 includes an accounts database 16, enhancement features database 18, issuers database 19 and feature providers database 20. These databases may be owned by an interchange or individual issuer banks. The system 10 can be accessed by any relevant user to identify and manage enhancement features assigned to the cards. The relevant users include cardholders, issuers of cards, interchange such as Visa®, Mastercard® and American Express® and enhancement feature providers.

The system 10 is connected to a computer network 4 through a communication link 6. In the embodiment shown, the network 4 includes a combination of private networks such as VisaNet® and public networks such as the Internet to provide many different ways for accessing the system. A transaction history database 8 storing the historical transaction history of cardholders may be connected to the enhancement features management system 10 through the network 4 for analyzing and reporting on the card usage as will be explained in detail later herein.

Figure 2:
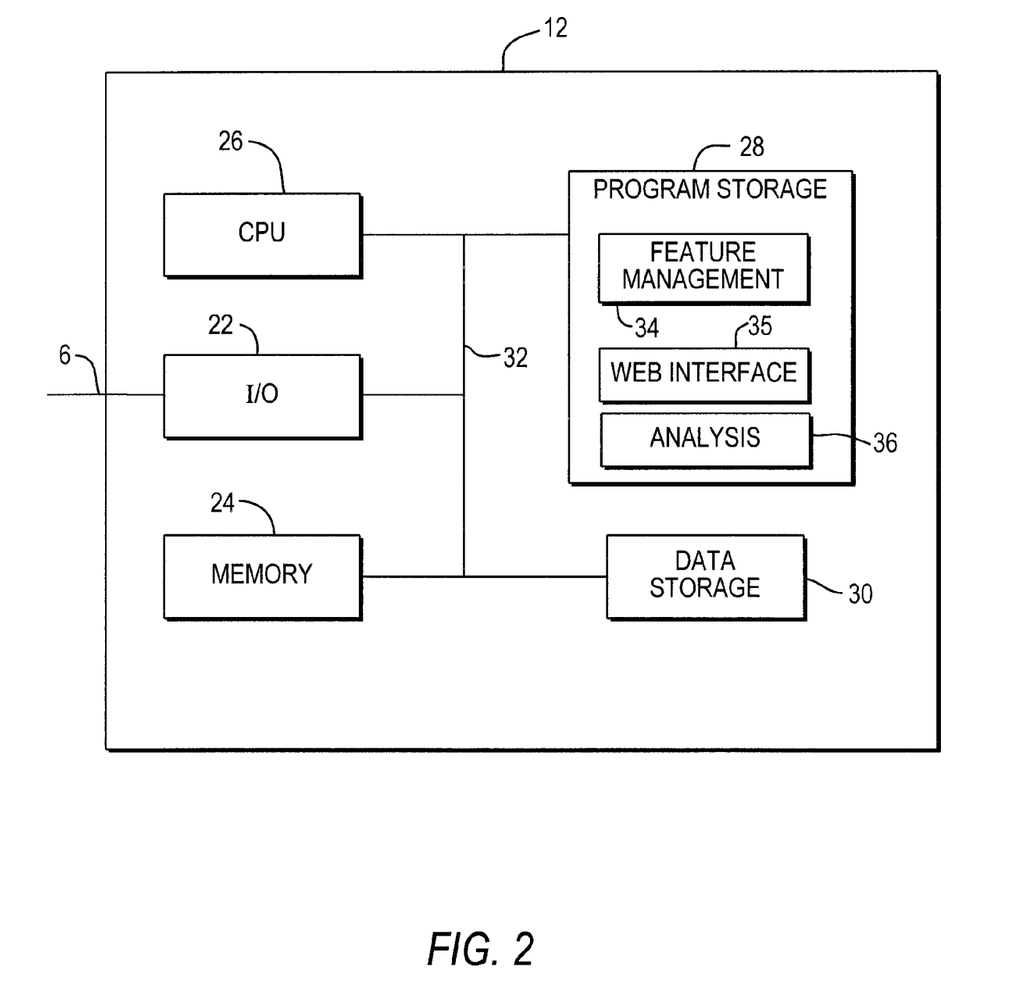
FIG. 2 illustrates a block diagram of a server computer that stores and executes a feature management software module.

Referring now to FIG. 2, the EMS server 12 of the present invention centrally manages enhancement features assigned to each individual credit card independent of other credit cards. The server 12 includes a multitasking, real-time software technology that can concurrently handle hundreds of thousands of queries and updates.

The server 12 is connected to the communication link 6 through an I/O interface 22, which receives information from and sends information over the communication link 6 to various users such as card holders and card issuers. The server 12 of FIG. 2 includes memory storage 24, processor (CPU) 26, program storage 28, and data storage 30, all commonly connected to each other through a bus 32. The program storage 28 stores, among others, a feature management program or module 34, an analysis module 36 and web interface module 35. Any of the software program modules in the program storage 28 and data from the data storage 30 are transferred to the memory 24 as needed and is executed by the CPU 26.

The server 12 can be any computer such as a personal computer, minicomputer, workstation or mainframe, or a combination thereof. While the server 12 is shown, for illustration purposes, as a single computer unit, the system may comprise a group/farm of computers which can be scaled depending on the processing load and database size.

Figure 3:
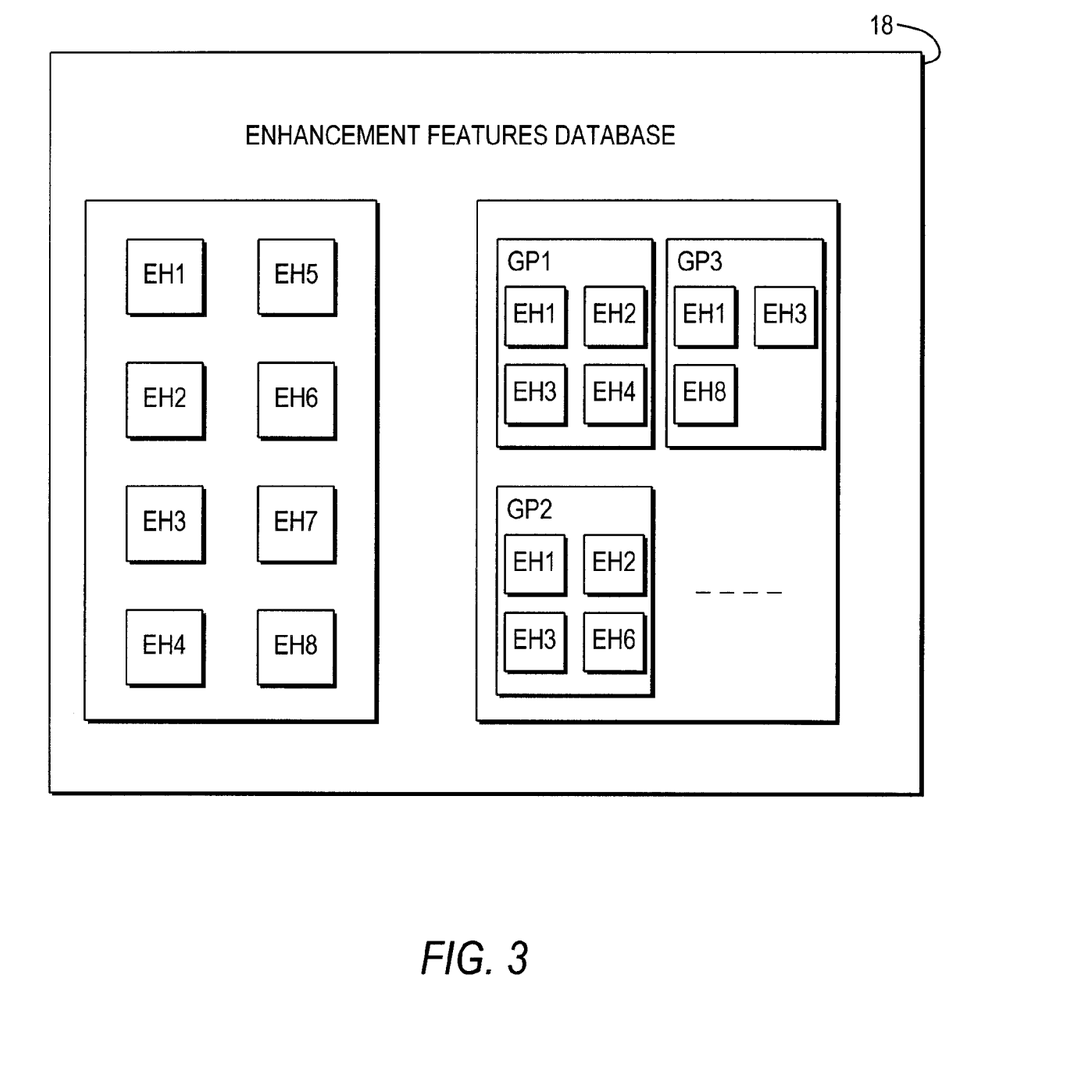
FIG. 3 illustrates the data structure of an enhancement features database.

As shown in FIG. 3, the enhancement features can be identified in two ways. It can be identified by an individual enhancement feature number such as Eh1 for enhancement feature number 1. It can also be identified in a group of enhancement features. For example, Group one (Gp1) includes enhancement feature numbers 1, 2, 3 and 4 while Group two (Gp2) includes enhancement feature numbers 1, 2, 3 and 6.

Figure 4:
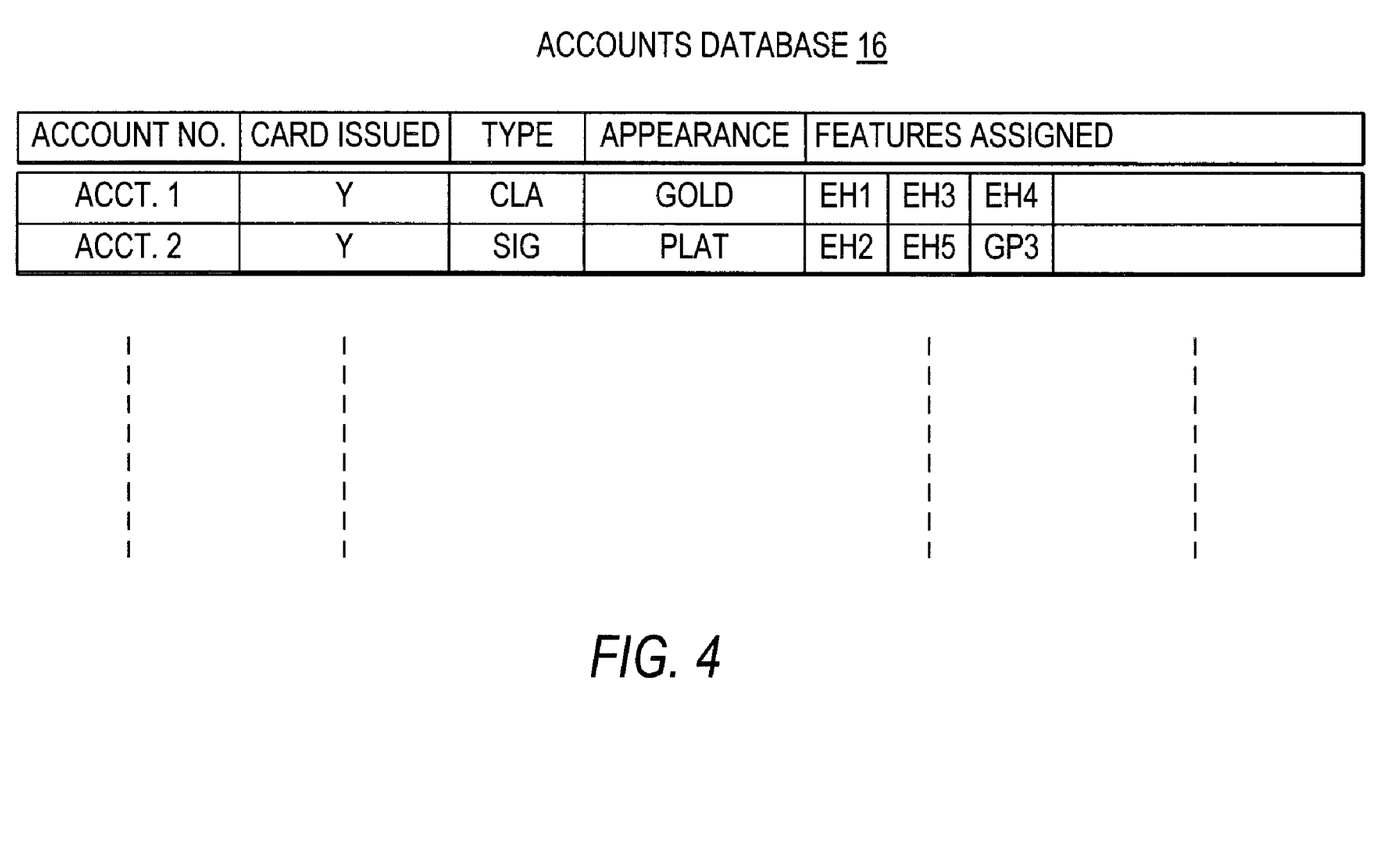
FIG. 4 illustrates the data structure of an accounts database.

The data structure of the accounts database 16 that contains the assigned enhancement features for individual cards is shown in FIG. 4. Each account holder's data in the database 16 is accessed by the EMS server 12 using a 16 digit credit card number associated with the account which is unique to that particular card. Each account contains a series of account holder data fields for storing the enhancement features assigned to the associated credit card. For example, enhancement feature numbers 1, 3 and 4 are assigned to the holder of account one (acct 1) while feature numbers 2 and 5, and feature numbers 1, 3 and 8 (members of Group three) are assigned to the holder of account two (acct 2).

Aside from the assigned enhancement features, the accounts database 16 contains other data such as the card type, appearance and "Card Issued" fields that are used by the feature management module 34.

Figure 5:
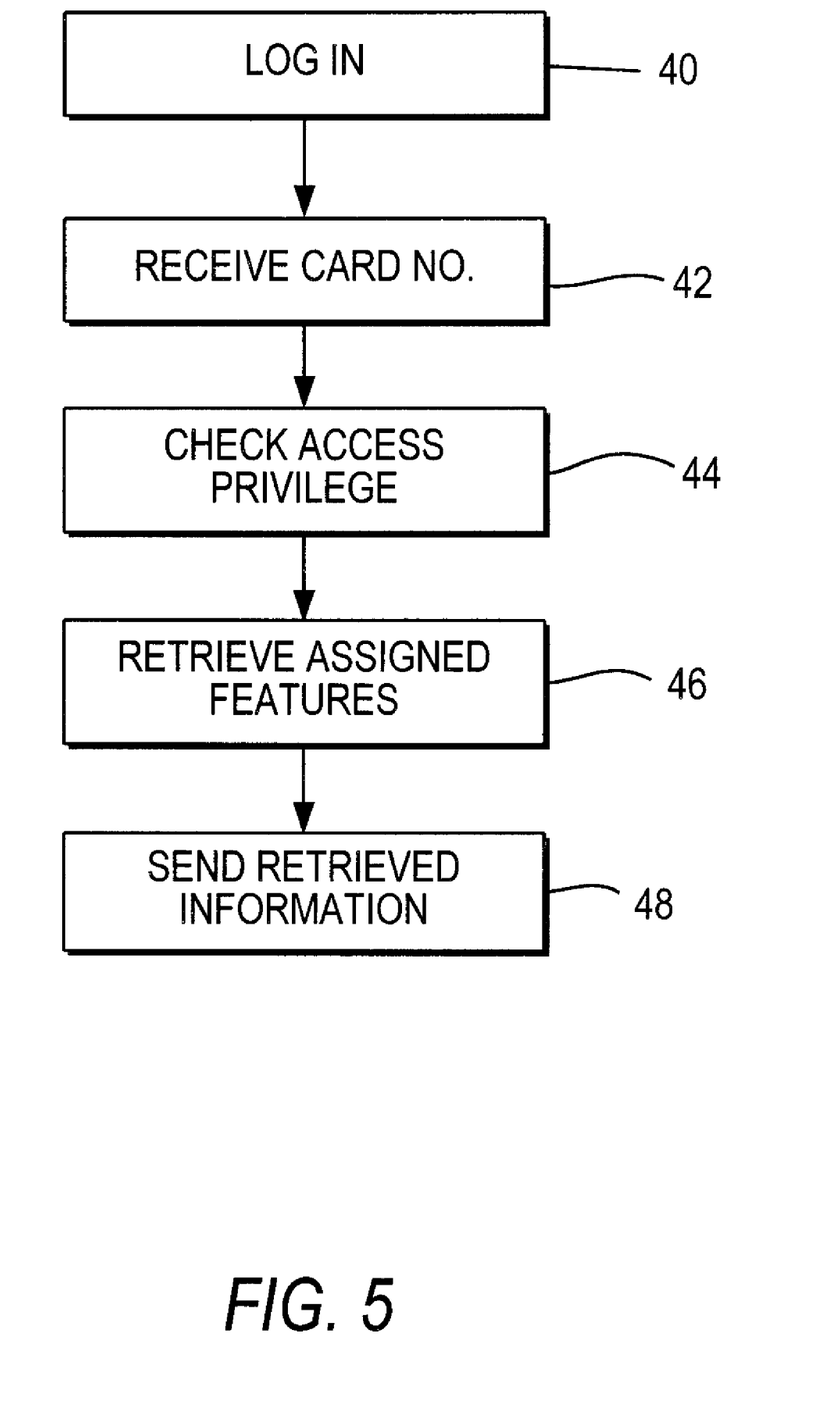
FIG. 5 illustrates a method of querying the accounts database to determine what enhancement features are assigned to a particular credit card.

A method of querying the accounts database 16 to find out what enhancement features are assigned to a particular credit card will now be described with reference to FIG. 5. The method is part of the feature management module 34 executed by the CPU 26 of the server 12. In step 40, a user logs in to the server 12 by submitting a user identification and a password. If the user is accessing the server 12 through the Internet, the web interface module 35 works in conjunction with the feature management module 34 to generate web pages (e.g., HTML, XHTML and XML pages) that are appropriate for display in a web browser.

The server 12 checks the login information against an appropriate database (accounts database 16, issuers database 19 or feature providers database 20 as the case may be) that stores such information. The server 12 determines whether the login information is valid. Once the login information has been validated by the server 12, the user submits and the server receives through the network 4 the full card number that uniquely identifies a particular card in step 42. In the embodiment shown, there are 16 digits in a credit card. Accordingly, the user submits the 16 digit credit card number as the account number. In step 44, the server 12 checks the access privilege of the user to make sure that the card number received is allowed to be queried. If, for example, the user is a card issuer and the credit card associated with the card number received was not issued by the issuer, then the server 12 denies access to any information related to such card number.

Once the sever 12 determines that the card number received is allowed to be queried, it transmits the received 16 digit card number to the accounts database 16 and retrieves the account data for the card including the assigned enhancement features (step 46). In step 48, the retrieved data is sent to the user through the network 4 for display at a user's computer.

Figure 6:
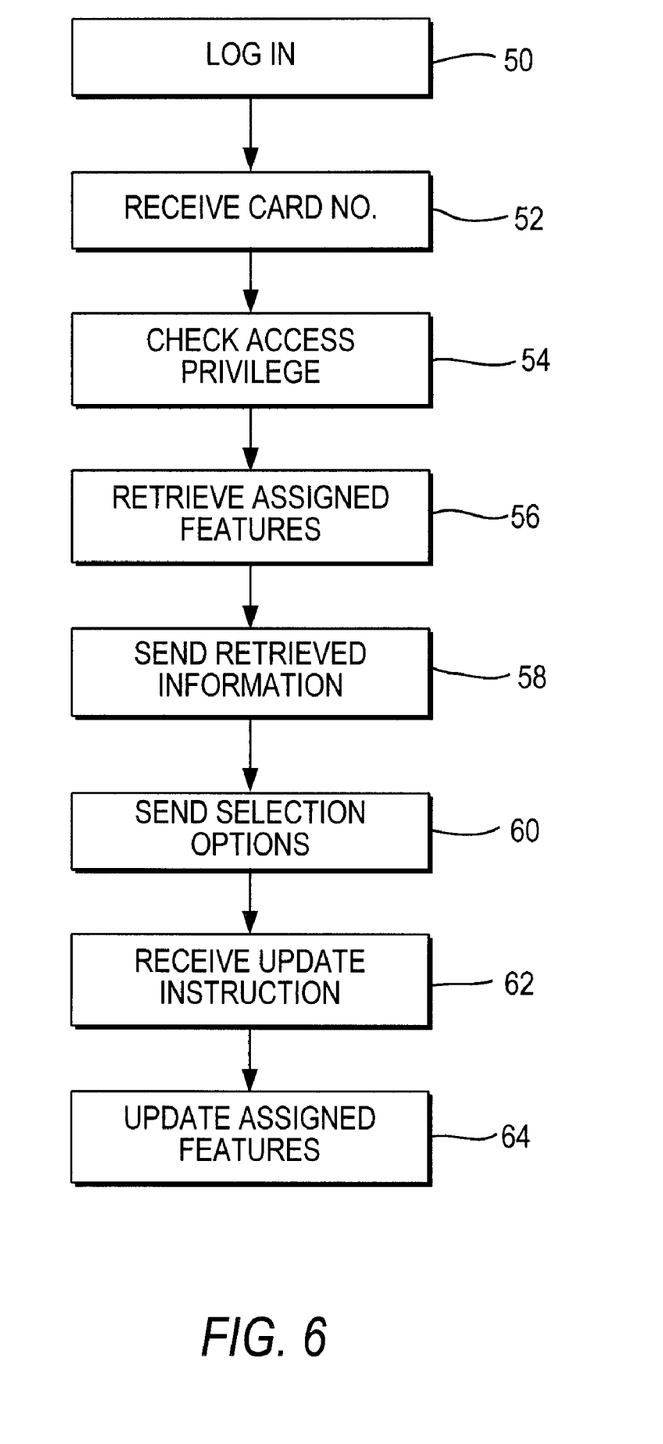
FIG. 6 illustrates a method of updating the enhancement features assigned to a particular credit card.

For certain users such as card issuers, the EMS server 12 allows updates to the assigned enhancement features as well as queries. FIG. 6 illustrates a method of updating the enhancement features assigned to a particular credit card. The method is part of the feature management module 34 executed by the CPU 26 of the server 12. Steps 50 through 58 are similar to respective steps 40-48 of FIG. 5, except that in step 54, additional privilege checking is performed by the feature management module 34. In addition to ensuring that the unique 16-digit card number received is allowed to be queried, the feature management module 34 checks to see whether the user is allowed to update the enhancement features assigned to the received card number. For example, if a card issuer (e.g., issuer bank) logs in, the server 12 allows the issuer to not only read, but to update the assigned enhancement features for cards that are issued by the issuer. On the other hand, if an enhancement feature provider for only a frequent flyer mileage feature logs in, the provider is allowed to only query whether the card number submitted in step 52 has the frequent flyer mileage feature.

In step 60, the server 12 prepares and sends selection options for the user. The selection options may include a list of selectable individual enhancement features, groups of enhancement features and options to delete the enhancement features that are already assigned.

The option of selecting enhancement features based on a group number may be especially appealing to issuers that are initially transitioning cardholders with existing card types to the new system 10. For example, to transition a cardholder having the Visa Traditional card type, the issuer may do so simply by selecting Group 1 option which includes all of the enhancement features assigned to the Visa Traditional card type.

In step 62, the server 12 receives the user's update instructions through the network 4. According to the user's instruction, in step 64, the feature management module 34 updates the account record associated with the credit card number by instructing the accounts database 16 to store the updated account record.

As can be appreciated, the ability to centrally manage enhancement features at the individual account number level is a powerful tool that allows a card issuer to develop a customized set of enhancement features for a customer segment which can be as small as one customer.

Figure 7:
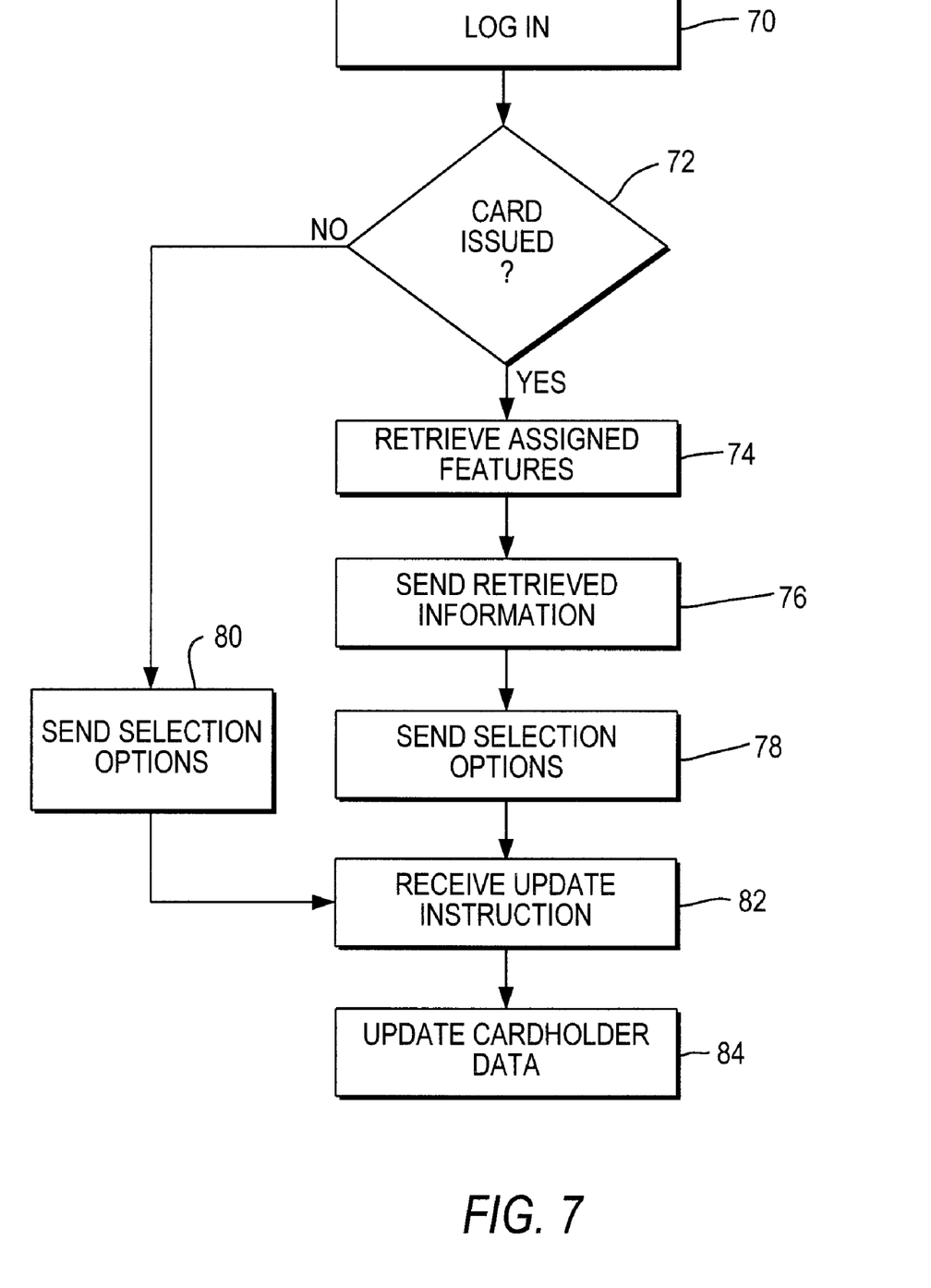
FIG. 7 illustrates a method by a cardholder to customize a credit card.

According to the present invention, the system 10 also allows a customer or cardholder to customize the enhancement features and even the physical appearance of the card as shown in FIG. 7. The method is again a part of the feature management module 34 executed by the CPU 26 of the server 12. In step 70, the cardholder logs in to the server 12 by submitting through the network 4 the full 16 digit card number that uniquely identifies the holder's card along with a password or a PIN assigned by the issuer of the card. The submitted card number and password are checked to ensure that the cardholder is a valid customer. Once the login information has been validated, the server 12 in step 72 determines whether a credit card has already been issued to the cardholder by checking the "Card Issued" field of the accounts database 16. If the card has already been issued, control of the feature management module 34 passes to step 74 in which the server 12 accesses the accounts database 16 and retrieves the account data for the card including the assigned enhancement features. In step 76, the retrieved data is sent to the cardholder through the network 4 for display at the cardholder's computer.

Next, the server 12 prepares and sends selection options for the cardholder (step 78). The selection options may include a list of selectable individual enhancement features, groups of enhancement features and options to delete the enhancement features that are already assigned.

Referring back to step 72, if a credit card has not been issued, the server in step 80 prepares and sends selection options for the cardholder. In addition to the selection options that step 78 sends, the enhancement options in step 80 may further include various customizable features of the credit card such as appearance (e.g., background image, color) and type of card (e.g., Traditional, Signature).

Regardless of the decision in step 72, the server 12 executes step 82 which receives the user's update instructions through the network 4. According to the user's instruction, in step 84, the feature management module 34 updates the account record associated with the credit card number and instructs the accounts database 16 to store the updated account record.

Referring back to FIG. 1, the system 10 may be connected to the transaction history database 8 which stores the card transaction usage history of the cardholders. The analysis module 36 works in conjunction with the feature management module 34 and the transaction history database 8 to generate target customer segments, update enhancement features and generate reports.

The analysis module 36 is used by issuers and interchange entities to query the accounts database 16 and the transaction history database 8 to target a selected set of accounts having particular criteria specified by the user. The criteria may be, for example, any account that charges an average of $10,000 per year in a transportation category. The feature management module 34 then updates the accounts database 16 by adding a selected enhancement feature (e.g., travel & emergency assistance services feature) and notifies the targeted cardholders of the update.

After a given period of time, the issuer can use the analysis module 36 to retrieve a card usage history of the target accounts from the transaction history database and generate a card usage report based on the retrieved card usage. This allows the issuer to evaluate how effective the added enhancement feature was by correlating the customer spending pattern to particular enhancement features. With such information, the issuer can target specific customer segments with those features that are likely to be useful, which will lead to increased card usage.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A system, comprising:
   an accounts database adapted to store account holder data for individual financial accounts, the account holder data identifying enhancement features assigned to the individual financial accounts, each of the individual financial accounts associated with an individual financial presentation device presentable to providers of goods or services; and
   a computer coupled to the accounts database and configured to execute a feature management module to:
      receive an account identifier that uniquely identifies a first financial presentation device and a selection of enhancement features to be assigned to the identified financial presentation device; and
      update the account holder data to associate the first financial presentation device with the selection of enhancement features, wherein the selection of enhancement features represents services or goods provided by an issuer of the first financial presentation device in addition to processing purchase transactions of an account holder of the first financial presentation device;
   wherein the selection of enhancement features represents a change of the first financial presentation device from a first type to a second type; and the account holder data is updated to associate the second type with the first financial presentation device without changing the first financial presentation device.

2. The system according to claim 1, wherein the computer is further configured to:
   execute the feature management module to change an enhancement feature for a targeted set of financial accounts; and
   execute an analysis module to retrieve a card usage history of the targeted set of financial accounts from a transaction history database and generate a usage report based on the retrieved card usage history.

3. The system according to claim 2, wherein the computer is configured to execute the feature management model to:
   receive an enhancement group identifier as the selection of enhancement features, the enhancement group identifier identifying a plurality of predetermined enhancement features; and
   update the account holder data based on the account identifier and the enhancement group identifier.

4. The system according to claim 1, further comprising an enhancement features database adapted to store data representing a plurality of enhancement features that are assignable to individual financial presentation devices.

5. The system according to claim 1, wherein the computer is configured to execute the feature management module to:
   receive an enhancement group identifier as the selection of enhancement features, the enhancement group identifier identifying a plurality of predetermined enhancement features; and
   update the account holder data based on the account identifier and the enhancement group identifier.

6. The system according to claim 1, wherein the computer is further configured to execute a web interface module to interact with a user to receive the account identifier and the selection of enhancement features.

7. The system according to claim 1, wherein the first financial presentation device is configured to present a credit, debit or prepaid account.

8. The system according to claim 7, wherein a financial account associated with the first financial presentation device has a 16 digit account number.

9. A method, comprising:
   storing, in an accounts database, account holder data to identify enhancement features assigned to individual financial presentation devices, each of the financial presentation devices being presentable to providers of goods or services to identify a respective financial account;
   receiving an account identifier that uniquely identifies a first financial presentation device;
   receiving a selection of enhancement features to be assigned to the first financial presentation device; and
   updating the account holder data to associated the first financial presentation device with the selection of enhancement features, wherein the selection of enhancement features represents services or goods provided by an issuer of the first financial presentation device in addition to processing purchase transactions of an account holder of the first financial presentation device;
   wherein the selection of enhancement features represents a change of the first financial presentation device from a first type to a second type; and the account holder data is updated to associate the second type with the first financial presentation device without changing the first financial presentation device.

10. The method according to claim 9, further comprising:
updating the account holder data for a targeted set of financial accounts to add at least one assigned enhancement feature; and
after the updating of the account holder data for the targeted set of financial accounts, retrieving a card usage history of the targeted set of financial accounts from a transaction history database; and
generating a usage report based on the card usage history.

11. The method according to claim 9, wherein:
the receiving of the selection of enhancement features includes receiving an enhancement group identifier as the selection of enhancement features, the enhancement group identifier identifying a plurality of predetermined enhancement features; and
the updating of the account holder data is based on the account identifier and the enhancement group identifier.

12. The method according to claim 9, wherein the receiving of the account identifier and the receiving of the selection of enhancement features are through a web browser.

13. The method according to claim 9, wherein the first financial presentation device is configured to present a credit, debit or prepaid account.

14. The method according to claim 13, wherein a financial account associated with the first financial presentation device has a 16 digit account number.

15. A computer readable medium storing software code configured to instruct a computer to perform a method, the method comprising:
receiving an account identifier that uniquely identifies a first financial presentation device;
receiving a selection of enhancement features to be assigned to the first financial presentation device; and
updating, in an accounts database, account holder data to associated the first financial presentation device with the selection of enhancement features, wherein the selection of enhancement features represents services or goods provided by an issuer of the first financial presentation device in addition to processing purchase transactions of an account holder of the first financial presentation device;
wherein the selection of enhancement features represents a change of the first financial presentation device from a first type to a second type; and the account holder data is updated to associate the second type with the first financial presentation device without changing the first financial presentation device.

16. The computer readable medium according to claim 15, the method further comprising:
updating the account holder data for a targeted set of financial accounts to add at least one assigned enhancement feature;
after the updating of the account holder data for the targeted set of financial accounts, retrieving a card usage history of the targeted set of financial accounts from a transaction history database; and
generating a usage report based on the card usage history.

17. The computer readable medium according to claim 15, wherein:
the receiving of the selection includes receiving an enhancement group identifier as the selection of enhancement features, the enhancement group identifier identifying a plurality of predetermined enhancement features; and
the updating of the account holder data includes updating the account holder data based on the account identifier and the enhancement group identifier.

18. The computer readable medium according to claim 15, wherein the receiving of the account identifier and the receiving of the selection of enhancement features are through the Internet.

* * * * *